United States Patent [19]
Hilbrands

[11] 3,937,058
[45] Feb. 10, 1976

[54] METHOD OF DETERMINING THE BEHAVIOUR OF A SHOCK ABSORBER IN THE SPRUNG MASS SYSTEM OF A VEHICLE AND A JIG FOR PERFORMING THE METHOD

[75] Inventor: Jan Willem Hilbrands, Hattingen, Ruhr, Germany

[73] Assignee: Maschinenfabrik Koeppern & Co. KG, Germany

[22] Filed: Nov. 6, 1974

[21] Appl. No.: 521,409

Related U.S. Application Data

[63] Continuation of Ser. No. 268,452, July 3, 1972, abandoned.

[30] Foreign Application Priority Data

July 3, 1971   Germany............................ 2133234

[52] U.S. Cl. ................................................. 73/11
[51] Int. Cl.² ........................................ G01M 17/04
[58] Field of Search ............ 73/11, 67.1, 71.6, 71.7, 73/92

[56] References Cited

UNITED STATES PATENTS

| | | | |
|---|---|---|---|
| 2,496,632 | 2/1950 | Lazan ................................. | 73/67.3 |
| 2,848,892 | 8/1958 | Hoffman ........................... | 73/141 A |
| 2,865,173 | 12/1958 | Dickie................................ | 73/92 X |
| 3,488,999 | 1/1970 | Catania.............................. | 73/92 X |
| 3,520,180 | 7/1970 | Polhemus et al. .................... | 73/71.7 |
| 3,690,145 | 9/1972 | Brisard................................... | 73/11 |
| 3,706,349 | 12/1972 | Paelian et al. ................. | 73/141 A X |
| 3,751,994 | 8/1973 | Gross................................. | 73/71.6 X |

Primary Examiner—Charles A. Ruehl
Attorney, Agent, or Firm—Craig & Antonelli

[57] ABSTRACT

A method and jig for determining the behavior of a shock absorber arranged in a wheel suspension unit of a vehicle in which the vertical contact force applied by the wheel is measured while the wheel is being subjected to shocks applied to the wheel in a cycle according to a predetermined relationship of amplitude to frequency.

23 Claims, 9 Drawing Figures

METHOD OF DETERMINING THE BEHAVIOUR OF A SHOCK ABSORBER IN THE SPRUNG MASS SYSTEM OF A VEHICLE AND A JIG FOR PERFORMING THE METHOD

This is a continuation of application Ser. No. 268,452 filed July 3, 1972, now abandoned.

The invention concerns a method of determining the behavior of a shock absorber arranged in the wheel suspension in the sprung mass system of a vehicle and a jig for performing the method.

The shock absorbers form an essential element of a vehicle devised to achieve a stable ride. Since on the other hand shock absorbers are wearing parts, it is important to have facilities which would allow, by simple means, to establish the condition of the shock absorber at any time. Various methods and jigs devised for this purpose are known.

In a known method, the sprung mass system of the automotive wheel suspension is made to vibrate at a frequency greater than the natural frequency. The wheel is then allowed to vibrate and subsequently, a diagram of the amplitudes occuring during vibrations is plotted over time. For evaluating the shock absorber, the maximum amplitude which is applied is the amplitude of the whole sprung system. This sprung mass system includes also the sprung mass system of the vibration generator. The methods known so far allow only the evaluation of shock absorbing effect of the shock absorber but not its behavior and its effect within the sprung mass system of the vehicles and thus the behavior of the vehicle.

It is also known how to bring about sudden relief of the sprung mass system of the wheel suspension for example by allowing the wheel of the suspension unit, including the shock absorber to be tested, to fall suddenly. In this method, the wheel oscillations are also used as the criterion for evaluating the shock absorber. This method is again devised with a view to establishing the damping effect of the shock absorber.

Furthermore, mechanical test jigs for shock absorbers removed from their location are known with the aid of which mainly the shock absorber hysteresis can be measured. This testing is again not devised to give information on the behaviour of the shock absorber in situ and, in addition, involves a great deal of time-consuming dismantling and re-fitting.

Noise testing jigs are also known in which the whole vehicle is caused to vibrate through the wheels. In such tests, shock absorbers are frequently tested by ear. Reproducible values cannot be established by this method.

None of the abovementioned known methods allow direct conclusions to be made of the effect of the shock absorber on vehicle behavior, in particular on its side guidance. However, it is important to establish this effect because a shock absorber which is absolutely intact but not suited to the sprung mass system of the wheel suspension can produce a serious negative effect on the behavior of the vehicle.

The purpose of the invention is to create a method by which the effectiveness of a shock absorber in the sprung mass system of a vehicle is established in a simple way and also by which the effect of the shock absorber on the side guidance forces in the vehicle can be determined.

This task is achieved according to the invention by measuring the vertical contact force applied by the wheel while the wheel is being subjected to shocks in a cycle according to a predetermined relationship of amplitude to frequency.

Since the side guidance forces of the wheel of a vehicle directly depend on the contact force of the wheels, the effect of the shock absorber on the side guidance forces of the wheels and thus the effectiveness of the shock absorber in the sprung mass system in a vehicle can be established directly through the contact force measured in accordance with the method covered by this invention. At the same time, the measured values can be evaluated by comparison with the values obtained from a sprung mass system producing an optimum effect. A contact force which is lower in comparison with existing datum values is an indication of wear in the shock absorber. A border line between usuable and unusable shock absorbers can be established by laying down tolerance limits.

However, the method covered by this invention does not only establish wear in shock absorbers but it also determines whether they are unsuitable, as for example in possible instances where non-standard but generally better quality shock absorbers are fitted. Unsuitability of any particular choice cannot be established by the known methods.

The method according to the invention finally offers a special advantage by the fact that measurements can be made continuously. Thus, it is possible to perform tests at vibrations with a variable amplitude/frequency curve in which all loads occurring in normal road operation can be included. Thus, it is possible to judge the effectiveness of the shock absorber also under all normally encountered load conditions and in particular under extreme load conditions.

The wheel contact force is suitably measured by deformation of a body deformed under the force. It is then possible at the same time to measure the deformation of the body and to indicate it as a multiple of the deforming force. The wheel contact force multiplied by the deformation gives the lost work of the sprung mass system. Since the lost work due to friction is relatively small in this system, the lost work which has been established is mainly the lost work occurring in the shock absorber fitted to the system. The lost work can thus be used as an additional criterion for judging the condition of a shock absorber.

Electrical signals sent out by the jig, which are a function of the wheel contact force, can easily be processed further. For example, they can be plotted in the form of a curve. In many cases, particularly in routine research work, a simple "YES-NO" indication is sufficient. For example, a drop below a minimum value can be indicated by a "NO". In practice, a very brief drop below a minimum recovery force has no effect on the effective side guidance force. Therefore, it may be worthwhile to introduce to a "YES-NO" indication a signal integration which eliminates pulselike signal peaks.

Since the variation band of the wheel contact force increases wear, the difference between the maximum and the minimum wheel contact force can be added as an evaluation criterion.

The body which is deformable under load is preferably designed in the form of a diaphragm which is integral with an outer supporting ring, the latter being connected to a bearing plate. At the same time, the centre of the diaphragm is suitably designed and provided with attachments for fixing a separate wheel-supporting plate. It is preferably designed as an annular diaphragm between the outer supporting ring and a central circular plate which carries the attachments.

In order to prevent overloading the diaphragm, the bearing plate is preferably provided with a stop face for the diaphragm. The stop face can be designed as a centrally located circular face the diameter of which substantially corresponds to the diameter of the fixing plate in the centre of the diaphragm ring, this fixing plate also being designed as a stop element.

A preferred version of the design has at least four strain strips equi-spaced circumferentially around the diaphragm and connected as a resistance in a branch of an electric bridge circuit. In a particularly well designed version, eight strain strips are equi-spaced circumferentially around the diaphragm, two of the strips being located at generally diametrically opposed points, each such pair being wired in parallel with each other in the bridge branch. Such an arangement compensates shifts of the effective wheel contact in relation to the diaphragm axis. In this manner, it is possible to provide tolerance ranges for the effective wheel contact which can be easily maintained under rough workshop conditions without the accuracy of the measurement suffering.

The vibration drive can either be mechanical or hydraulic.

Two wheel-supporting plates each with vibration drive are suitably provided side-by-side in a jig at a distance corresponding to the distance between a pair of wheels of a vehicle. The vibration drives are preferably designed in such a way that the wheelsupporting plates can be impacted either synchronously or asynchronously. In this way, the wheel contact force can be calculated under conditions which are very close to practice.

In order to be able to test vehicles with different track width at least one of the devices is adjustable laterally.

A test jig in accordance with the invention is now illustrated by means of the following drawings, in which.

Figure 1:
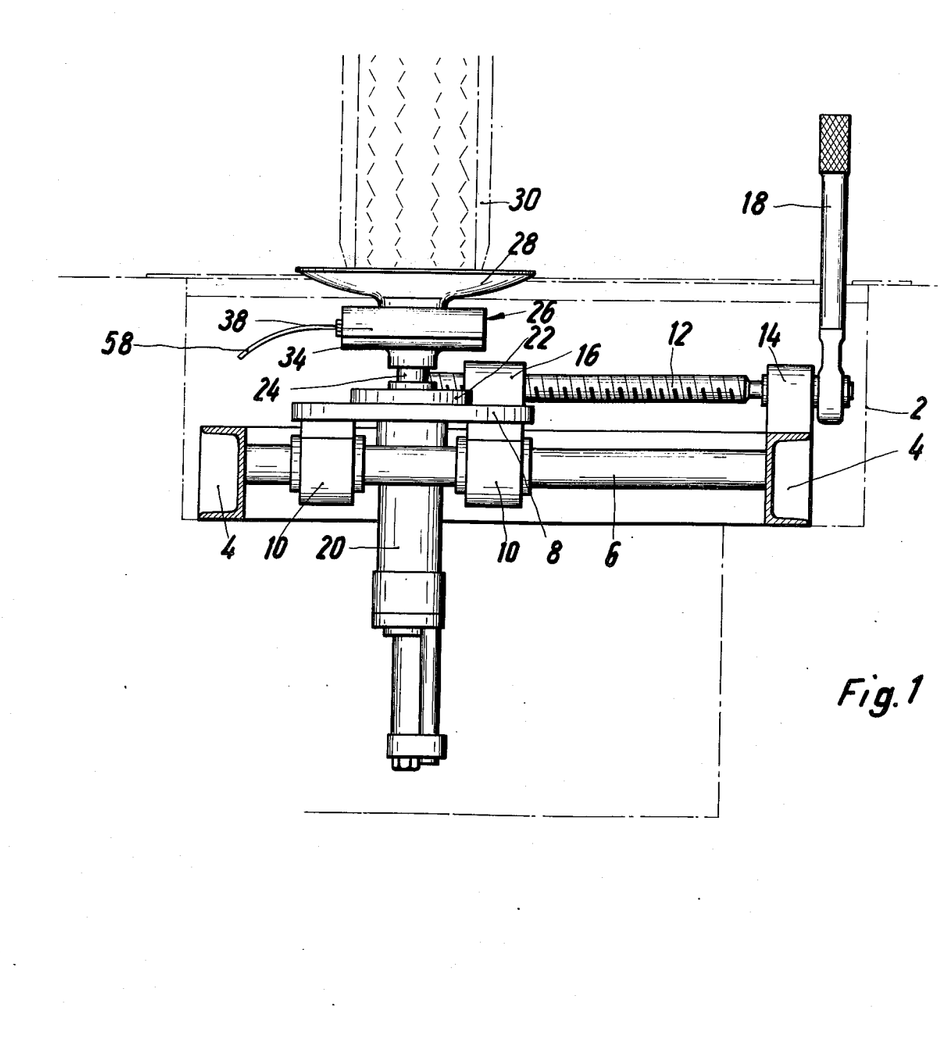
FIG. 1 is an elevation of the test jig in a position adjacent a wheel of which the associated shock absorber is to be tested, looking in the end-on direction of the wheel.
Figure 2:
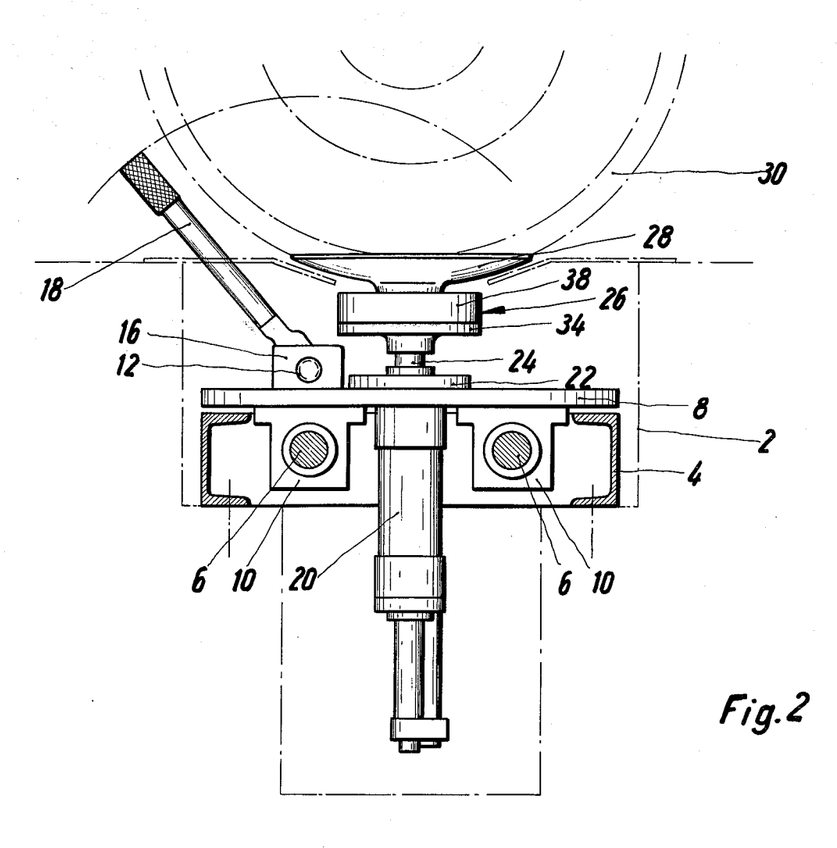
FIG. 2 is a lateral view of the same jig, looking at the side of the wheel.

The test jig illustrated by FIGS. 1 and 2 shows a carrying frame 4 arranged and fixed in a pit 2, in which two bars 6 are located parallel to each other. A slide 8 with two bearing lugs 10 is adjustable longitudinally on the bars 6. Adjustment can be effected by means of an adjustment spindle 12 which is axially immovable but can be swivelled in a bearing lug 14 on the frame 4 and engages in a threaded bore of a bearing lug 16 attached to the slide 8. The spindle 12 is operated by means of a handle which is connected with the spindle by means of a ratchet.

The slide 8 carries a ram 20 arranged vertically in the pit 2 and connected with the slide 8 by a flange 22. The ram 20 is the driven member of a hydraulic vibration drive which is described in detail hereinafter. A gauge head 26 is mounted on the outer end of the piston rod 24 of the ram 20. A dishshaped wheel-engaging plate 28 is carried on top of the gauge head 28 and supports the wheel 30 of the vehicle with which the shock absorber to be tested is associated.

Figure 3:
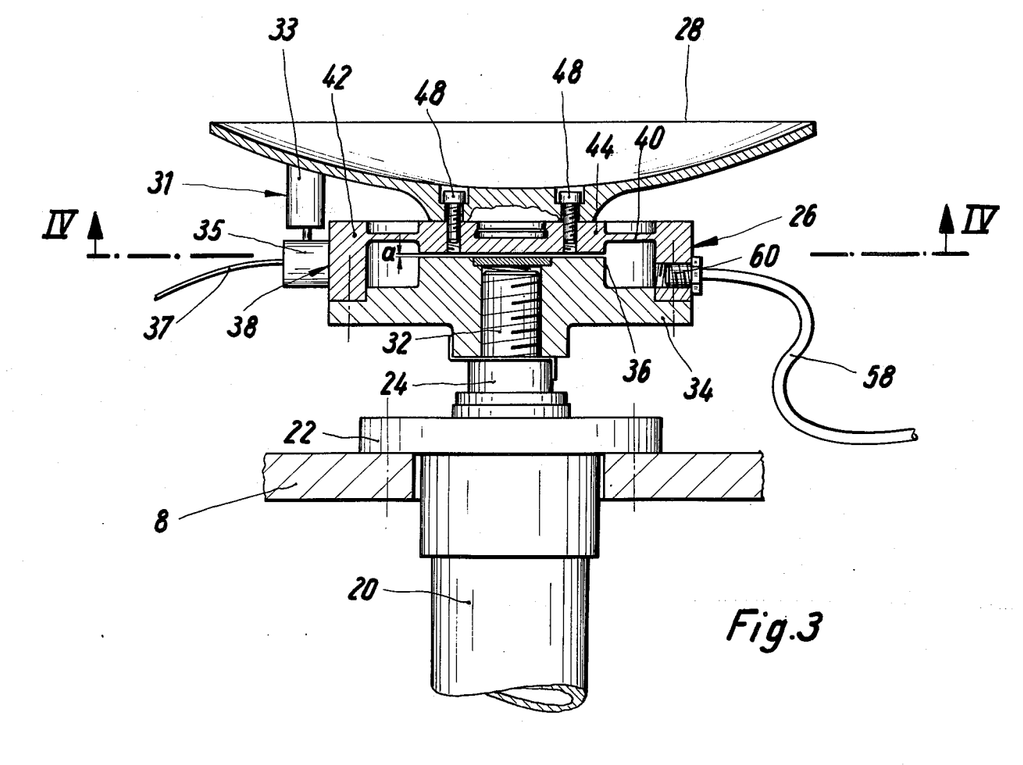
FIG. 3 is an enlarged view of part of FIG. 1 showing in section a force absorber of the jig.
Figure 4:
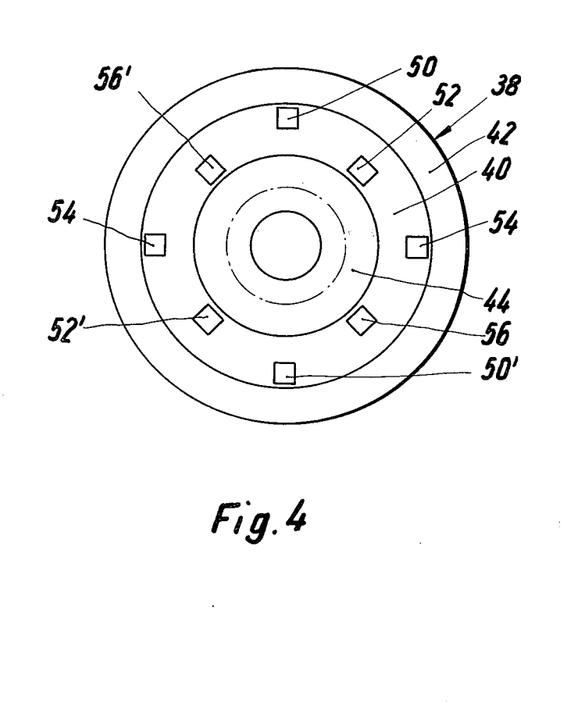
FIG. 4 is a section along line IV—IV in FIG. 3.

Details of the gauge head 26 are shown in FIGS. 3 and 4. The end of the piston rod 24 is threaded at 32 and carries a bearing plate 34 in the form of a flange. Its top is provided with a central circular raised area. A force absorber 38 is attached to the bearing plate 34 and has an annular diaphragm 40 which is integral with a cylindrical, outer supporting ring 42 and a circular plate 44 located in the centre of the diaphragm 40. The supporting ring 42 is located in a co-axial annular rebate on the outer periphery of the bearing plate 34 and is bolted to the bearing plate 34. The circular plate 44 preferably has the same diameter as the raised area 36 of the bearing plate 34. It is designed in such a way that there is a small clearance $a$ between its flat bottom and the top of the raised area 36 which is also flat. The opposite faces thus form stop faces which limit the deflection of the annular diaphragm 40. The dishshaped, wheel-supporting plate 28 is attached to the top of the circular plate 44 by means of screws 48.

As shown in FIG. 4, strain gauge strips, represented by squares, are positioned on the bottom of the annular diaphragm 40, or other elements capable of transmitting electric signals when the diaphragm 40 changes shape, are bonded to the diaphragm. These signal transmitters, referred to in the following description as strain gauge strips, are staggered at 45° to each other and are arranged in diametrically-opposite pairs 50, 50', 52, 52', 54, 54' and 56, 56'. The pairs of strain gauge strips may be arranged on different radii, as shown. Connecting wires leading from the strain gauge strips are carried in a cable 58 passing through a grommet 42 in a hole 60 in the outer supporting ring 42. (See FIG. 3).

Figure 5:
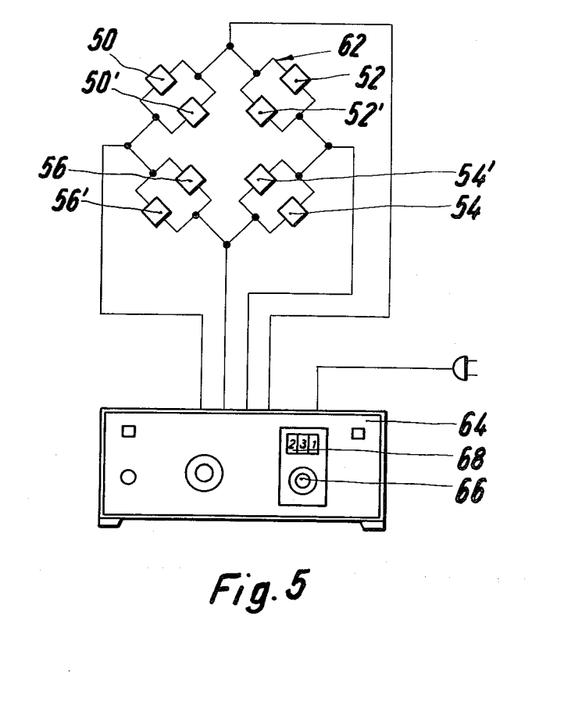
FIG. 5 shows an electrical circuit for processing signals from strain gauge strips shown in FIG. 4.

As shown in FIG. 5, the strain gauge strips are connected in an electric bridge circuit 62, each pair of strain gauge strips arranged at diametrically opposed locations being connected in each branch of the bridge. The paired arrangement of the diametrically-opposed strain gauge strips and their parallel connection in the bridge achieves considerable compensation for the measuring errors which can occur as a result of the centre of gravity of the wheel not being located on the vertical axis of the test jig passing centrally through the wheel-supporting plate 28. The datum signal from the bridge circuit is indicated by an indicator 64 which contains the bridge circuit shown externally of the indicator by way of illustration in FIG. 5. Indication can for example take the form of a YES-NO Sign, for example, in such a way that an audible or a visual sign is given when a specific signal value has not been reached. The specific value can, for example, be adjusted by means of the knob 66 combined with a setting indicator 68. The indicator circuit is preferably equipped with integration members by which a NO indication is given only when a signal from the bridge falls short of a specified lower datum signal during a specific part of the total cycle, in order to ensure that, for example, pulse-like signal failures, which in many instances do not represent any criterion for the overall behaviour of the shock absorber, are eliminated from the indication.

It would also be possible to produce a continuous recording of the signals in the form of a diagram and to use the diagram for evaluation of the behavior of the shock absorber. A YES-NO indication would be sufficient for most instances of workshop operation.

When evaluating signals from the strain gauge strips it should be noted that the measurements indicated are partly due to forces which originate from the mass of the circular plate 44 and the wheel-supporting plate 28. This influence on the measurement values can be kept small by keeping the mass of the plate 44 and of the wheel-supporting plate 28 small. This can be achieved, by making the wheel-supporting plate 28 from a material which has a high strength/weight factor, such as for example light alloy or a fiber-reinforced plastic. A continuous bowl could be replaced by one having apertures therein.

A transmitter 31 responsive to the stroke, i.e. amplitude of the vibration imparted by the piston rod 24 can be arranged between the wheel-supporting plate 28 and the bearing plate 34 or a part firmly attached to the bearing plate. The stroke transmitter comprises a part 33 firmly attached to the wheel-supporting plate 28 and a part 35 firmly attached to the ring 42, these two parts being movable in relation to each other. The stroke transmitter 31 can, for example, be an inductive stroke transmitter of a known type. The stroke transmitter transmits any electric signal through a cable 37 depending upon the relative positions of the two parts 33 and 35. Thus, this signal is also dependent on the deflection of the diaphragm 40 and thus the movement which the wheel-supporting plate 28 performs in relation to the bearing plate 34 under any given wheel contact force. If the stroke, i.e., amplitude, dependent signal issued by the stroke transmitter 31 is multiplied by the force-dependent signal which is produced by the strain gauge strips, a measurement is obtained of the work which appears as the lost work in the sprung mass system. This lost work is mainly the lost work of the shock absorber. Therefore, by measuring the stroke, it is, in addition, possible to establish the lost work of the fitted shock absorber and to compare it with the known lost work of a new shock absorber of the same type.

Figure 6:
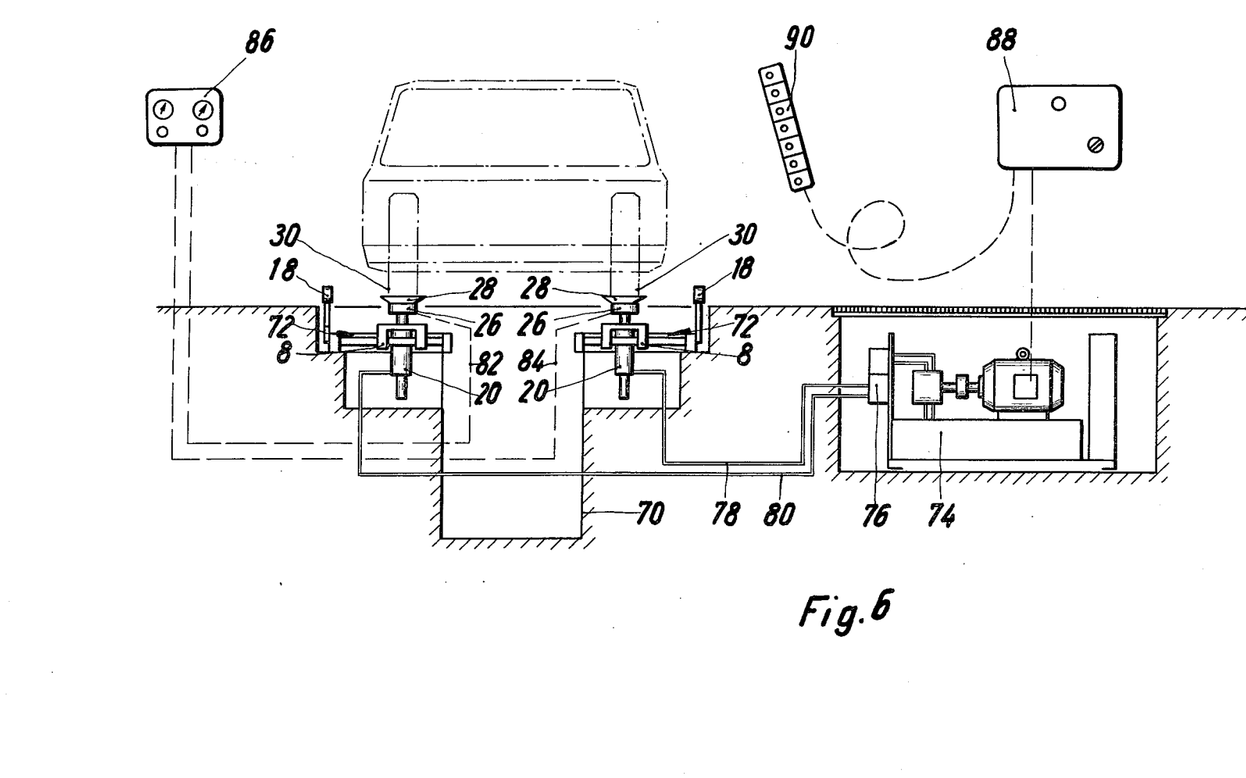
FIG. 6 is a diagram showing a system incorporating two test jigs, each similar to that shown in FIG. 1.

Referring now to FIG. 6 two test jig gauge heads 26, each similar to that described with reference to FIGS. 1 to 4, are connected with a signal processing and indicator unit 86 through cables 82, 84. Control is effected from a switch box 88 to which remote controls 90 can be connected for example over a loose cable. It is also possible to fit to the remote control panel 90 an indicator device, particularly when a YES-NO test is performed. Oscillation drives of the two test jigs used in the installation shown in FIG. 6 can be driven either synchronously or asynchronously. Oscillations can be changed from synchronous to asynchronous operation or vice versa within the test programme.

It is also possible to run on these jigs specific stroke-frequency patterns which can easily simulate conditions encountered in practice and can also be formed in such a way that, for example, mainly critical road conditions are simulated.

Figure 7:
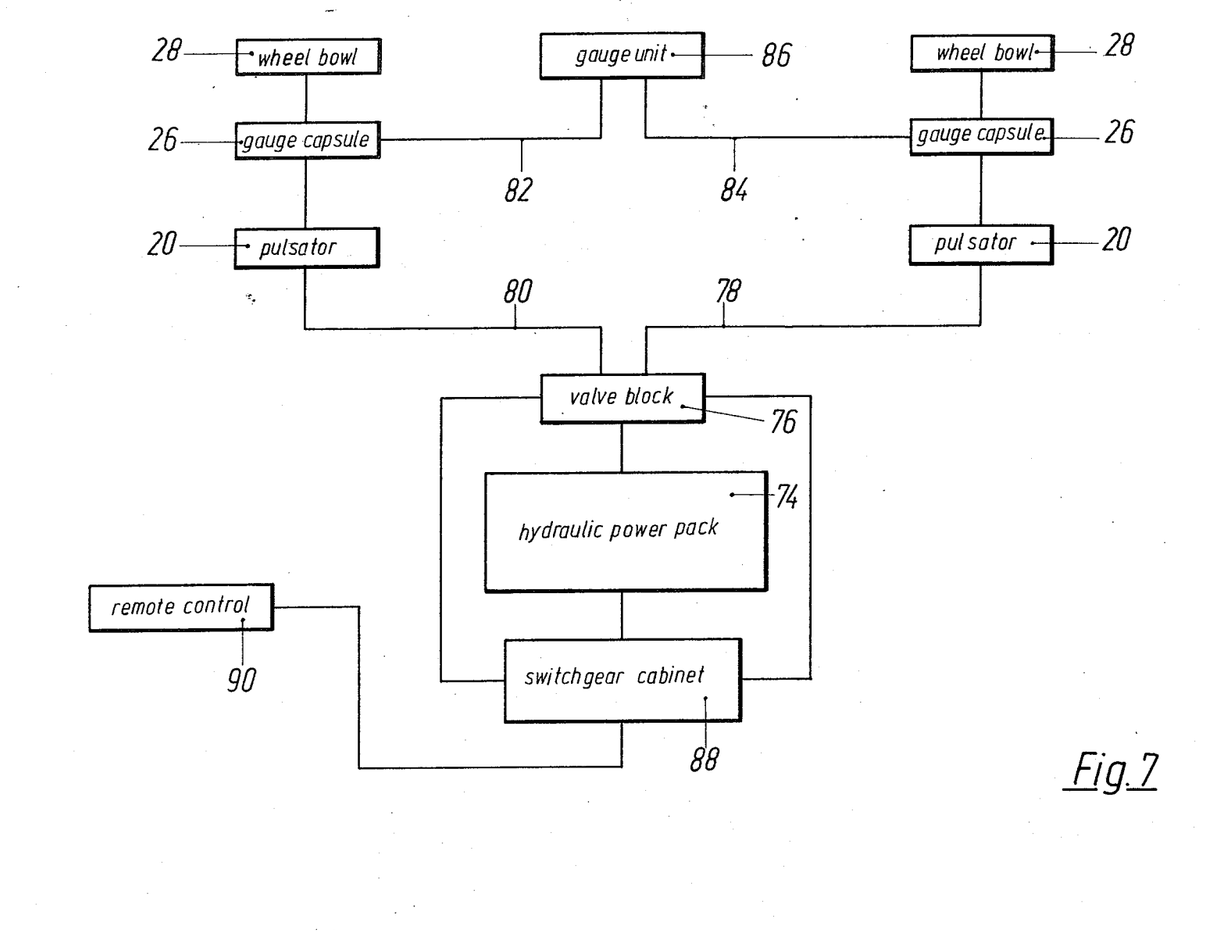
FIG. 7 is a block diagram illustrating the operation of the test jig shown in FIG. 6.

The schematic diagram of the system illustrated in FIG. 6 is shown in FIG. 7. Operation can be either over the remote control system 90 or by means of suitable controls mounted in or adjacent the switchgear cabinet SS. The hydraulic power pack 74 is controlled from the switchgear cabinet. Oil feed to the valves controlling each of the piston drives 20 is also pilot-controlled from the switchgear cabinet. The piston drives 20 operating as pulsators or vibrators receive intermittently pressure oil through the valves. Each drive 20 impacts the appropriate gauge head which in turn impacts the wheel resting over the bowl 28 past it. The gauge head 26 transforms the force, transmitted vertically from the wheel to the wheel bowl, into analogue electrical signals which are then processed and indicated in the gauge and indicator unit 86.

The resonance frequency of the wheel suspension in known vehicles is approximately within the range of 10 to 20 cycles per second. For testing the shock absorber, a frequency variation range should be provided to allow a run through this range during testing.

When a pneumatic vibration circuit is used as the frequency determining element, frequencies can be obtained on the jigs which are far beyond the resonance range indicated above. For example, it is possible to operate such a vibration circuit at a frequency range up to 40/50 cycles per second. It is also possible to increase the amplitude. Noise tests can also be run with the shock absorber test stand, which is the subject of this invention, without requiring much modification at higher frequencies and higher amplitudes.

The hydraulic power pack 74 can be provided with a fixed delivery pump. The advantage of this arrangement is that the speed at which the test is carried out remains constant over the whole frequency range.

Figure 8:
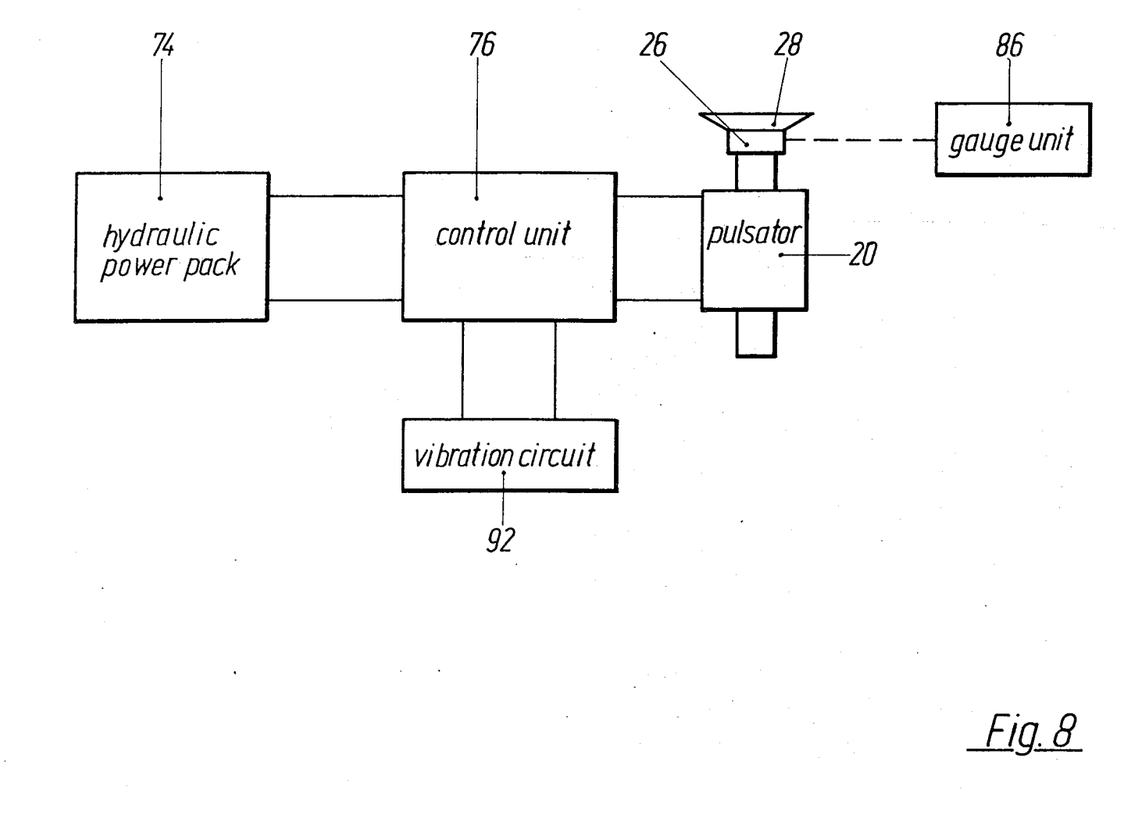
FIG. 8 is a block diagram of a test jig in accordance with the invention and provided with a hydraulic vibration drive.

Frequency control of the test rigs is shown in a block diagram in FIG. 8. Hydraulic fluid is fed in pulses from the hydraulic power pack 74 and the valve or control block 76 to the piston drive 20 the gauge head 26 of which is connected with the gauge unit 86. The valves of the control block are controlled by the vibration circuit 92 which is preferably controlled hydraulically while the vibration circuit can be provided with means of amplification to obtain sufficiently strong control signals.

Figure 9:
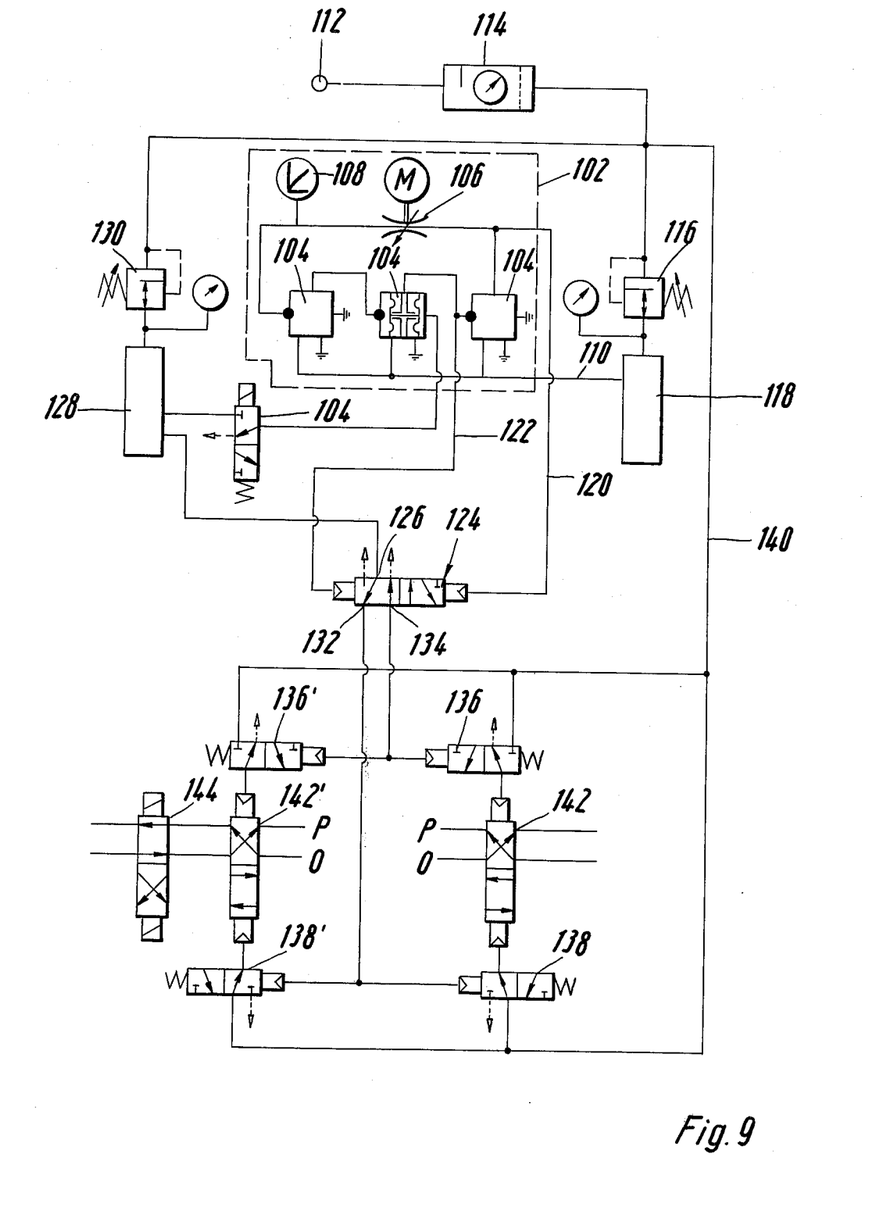
FIG. 9 shows details of a pulsing circuit for operating the control assembly of the power circuit of a hydraulic drive as shown in FIG. 8.

FIG. 9 shows the vibration circuit with valves, of the control block in a particularly useful arrangement, that is the part of the block diagram from FIG. 8 which is represented by blocks 76 and 92.

Figure 10:
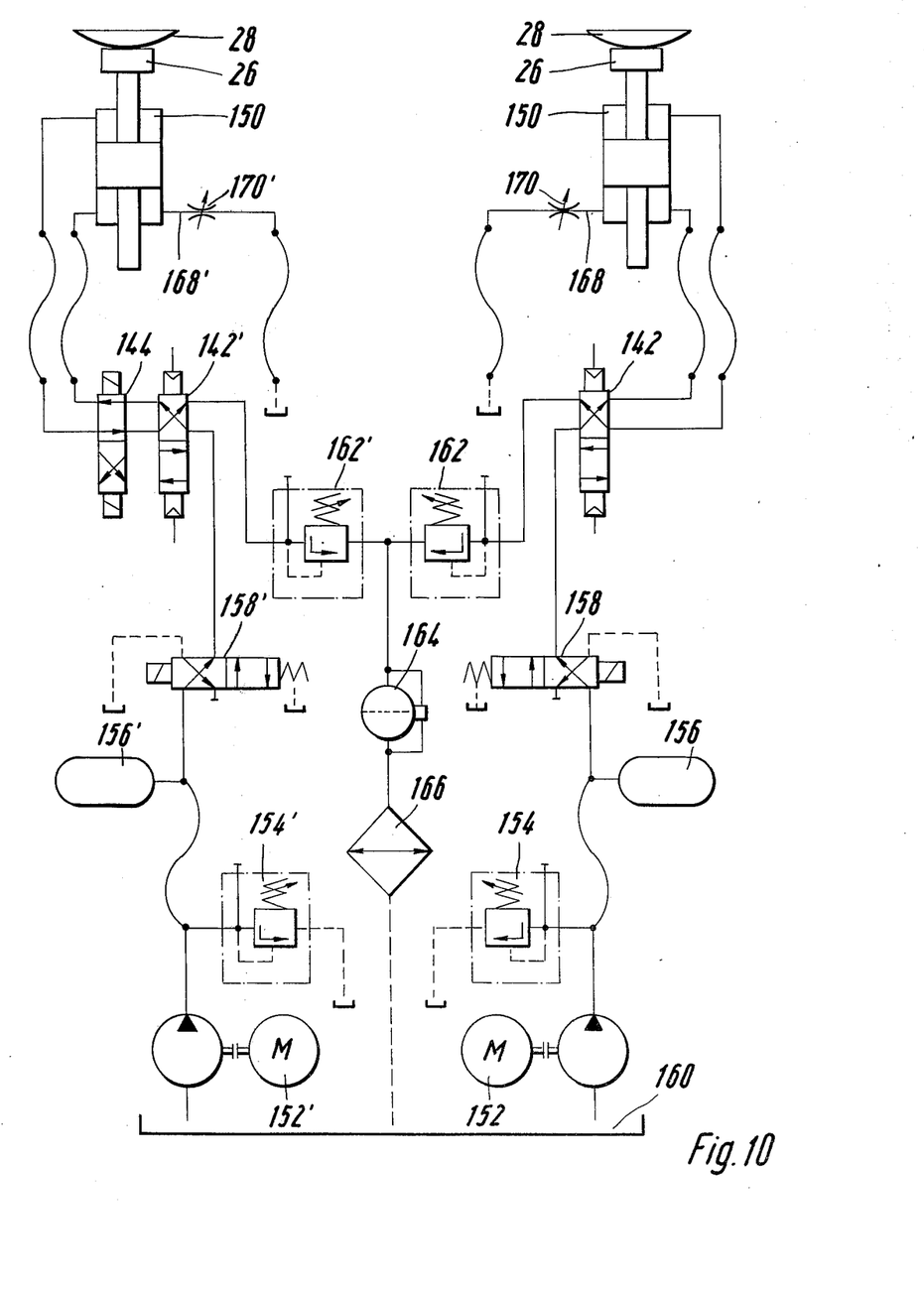
FIG. 10 shows the circuit of a hydraulic power pack of the control assembly and of the oscillating drive of the test rig shown in FIG. 8.

FIG. 10 shows the layout of a particularly useful design of the hydraulic power pack, the control block and the vibrator or pulsator, that is the part of the block diagram which is represented by blocks 74, 76, 20.

The vibration circuit 102 shown in FIG. 9 contains three fluidic elements 104, 10', 104'', with "no function", arranged one behind the other. The outlet of the last fluidic element 104'' is connected with the inlet of the first fluidic element 104 over an R-C member with a power adjustable throttle 106 and a volume 108. The volume can for example be the volume of the connection line itself.

The fluidic elements are preferably designed in the form of double-diaphragm valves, as shown in detail at the fluidic element 104'.

The fluidic elements are connected in parallel to the air supply line 110 which receives air at a constant pressure. In the case of double-diaphragm valves of the type supplied by Sunvick Regler G.m.b.H of Solingen, Germany the system operates at a pressure of approximately 1.4 bar. Pressure is taken from the standard compressed air system 112 through a service unit 114 in which air is cleaned. Clean compressed air is then set at the reduction valve 116 to the predetermined vibration circuit operating pressure. The pressure accumulator 118 ensures that pressure is kept constant within narrow tolerances.

Two branch lines 120, 122 are connected to the vibration circuit 102, staggered by one fluidic element in each instance. Since the fluidic elements with "non-function" are active elements, the branch lines 120 and 122 carry a pressure signal with each phase shift of approximately 180°.

The pressure valves tapped to the vibration circuit through the two branch lines are amplified in a preamplifier. This amplifier is a piston valve, pneumatically pilot-controlled on both sides, acting as a bi-stable switching element. Pressure signals in lines 120 and 122 connected to the control chambers of the pre-amplifier serve the purpose of pilot-controlling the pre-amplifier 124.

The pressure port 126 of the pre-amplifier 124 is connected over a pressure accumulator 128 and a reduction valve 130 to the line leading from the service unit 114. The pressure accumulator ensures that constant pressure is always available at the entry to the pre-amplifier. Two pneumatically pilot control valves 136, 136', or 138, 138' are connected to the two operating ports 132 and 134 respectively. The pressure ports of the pilot control valves are connected over line 140 direct to the air supply service unit 114.

The outlets of the pilot control valves are in each case connected to a pilot control chamber of two reversing valves 142, 142' pneumatically pilot controlled on both sides. The control chambers of both reversing valves are alternatively actuated by compressed air through the pilot control valves.

The operating ports on the reversing valves, each of which is connected to the two cylinder spaces of the piston drives, are alternately connected to the oil pressure port P and the oil return port O.

Since the operating pressure of the oscillating circuit 2 and the atmospheric pressure are present alternately in the tapping lines 120 and 122, the full signal pressure of the oscillating circuit is always available for pilot control of the pre-amplifier valve 124.

Thus it is possible to obtain with the pre-amplifier valve 124 high switching speeds and a high degree of pressure amplification.

The oscillating frequency of the oscillating circuit 102 is infinitely variable by means of the adjustment motor of throttle 106. The working frequency range lies between 0.1 and 100 Hz. A frequency error of less than ± 1% has been established over this variation range.

The adjustment motor of the throttle 106 can be pilot controlled in accordance with a specific programme. Accurate reproduction of specific amplitude/frequency profiles can be achieved when fixed ajdustment control programmes are used for the throttle.

A deliberately operated valve 46 is provided for switching the oscillating circuit on and off. The pressure port on this valve communicates with the pressure accumulator 28 while the operating port communicates with the control chamber of the double diaphragm valve 4' which lies opposite to the control chamber actuated by the input signal of this double diaphragm valve and is not required when made nonoperational. Pressure fed to this control chamber through valve 46 should be the same or greater than the operating pressure of the oscillating circuit. The oscillating circuit rests when pressure is applied.

A second reversing valve 44 is post-mounted in series with the reversing valve 42'. As can be seen in FIG. 10 the piston drive 150' and thus one of the test devices can be set synchronously or asynchronously to the piston drive 150.

The circuit shown in FIG. 10 has a separate oil pressure pump 152, 152' for each piston drive, the delivery side of which is fitted with a pressure lifting valve 154, 154' for safety. A pressure accumulator 156, 156', is connected to the pump delivery lines 152, 152'; a solenoid operated 4/2-way valve 158, 158' is fitted between the pumps 152, 152' and the reversing valves 142, 142' by means of which pump delivery can be directed either to the pressure line leading to the reversing valves or to the no-pressure re-circulating line. Starting of the pump under load can be prevented by valves 158, 158'.

A pre-loading valve 162, 162', by means of which a specific pressure can be maintained in the chamber of the piston drive which is switched to return, is fitted to the oil return line leading from the return oil connection of the reversing valves 142, 142' to the tank 160. Lines leading from the two pre-loading valves 162, 162' are connected to a common line leading to the tank in which the oil filter 164 and, if necessary, the oil cooler 166 are fitted one behind the other.

Since both reversing valves 142 and 142' are switched synchronously, both the piston drives 150 and 150' perform synchronous motions in the same direction. When oil flow to the piston drive 150' is reversed by means of the reversing valve 144, constant phase rotation is achieved also in synchronous running and independent of the accuracy of phase rotation of the pressure signals set out by the oscillating circuit.

As can be seen from FIG. 10, the bottom cylinder spaces of piston drives 150 and 150', that is those cylinder spaces which are actuated by oil pressure against the load acting on the load carrying plate, are connected with the tank over lines 168, 168'. These lines are fitted with throttles 170, 170' which can for example be adjustable; oil can be discharged through them to the tank at a slow rate always in a ratio to the rate of flow of the operating oil. This takes care of changing the oil in the cylinder chamber and preventing excessive build-up of oil temperature in this chamber which would otherwise result in damage to piston rod seals. Such heating of the oil is caused by the fact that the relatively small amount of oil is practically moving during operation to and fro in the line between the piston drive 150, 150' and the reversing valve 142, 144 only so that the oil changes in that line over a long period only, if at all. A relatively quick oil change is ensured thanks to the oil discharge from the piston drive determined by the throttle section, without affecting the operation. Communication between the upper cylinder space and the tank may of course be arranged if necessary.

The test jig can be located in a pit below floor level, as shown in FIG. 6. However, it is of course, possible to locate it above floor level and to provide approach and descent ramps for the vehicle. Jigs can be mounted permanently in such an arrangement above floor level. However, it is also possible to make the whole test jig portable.

A version with mechanical drive can for example be provided with a four-arm control mechanism. In this arrangement, the fixed arm can have two superimposed joints and the measuring head can then be attached to the arm located opposite to the fixed arm, which is arranged in the joint rectangle with a vertical axis. One of the two other arms can then be arranged as the vibrator arm at which the drive is engaging. The drive may consist of a motor with variable speed which may be either an electric motor with variable speed or, preferably, a variable hydraulic motor. The motor may be connected with the vibrator drive arm by means of a crank.

The mechanical arrangement of the guides for the measuring heads and of the means for the transmission of force to the measuring heads can of course be solved in a different manner.

Means for side adjustment at least at one of the two jigs allowing adaptation for the track width of the tested vehicle should also be provided on a jig installation with a mechanical system. The means of adjustment may vary from those shown in FIG. 1 and may include hydraulic or air cylinders. Such an adjustment system can be more easily operated by remote means and provides higher adjustment speeds.

What I claim as my invention and desire to secure by Letters Patent of the United States is:

1. A jig for determining the behavior of a shock absorber arranged in a wheel suspension unit within the sprung mass system of a vehicle, comprising a wheel supporting plate, a body deformable under load on which the supporting plate is mounted, a bearing plate engaging the deformable body, means for applying vertical vibrations to the bearing plate, and means responsive to the deformation of the body, said deformation responsive means providing at least one electrical signal representing the magnitude value of the vertical contact force of the wheel on the wheel-supporting plate during the applied vertical vibrations, and determining means responsive to said deformation responsive means for indicating whether the magnitude value of the vertical contact force exceeds a predetermined magnitude value as an indication of the useability of the shock absorber.

2. A jig according to claim 1 in which the deformable body is a diaphragm having an integral outer supporting ring mounted on the bearing plate.

3. A jig according to claim 2 in which the diaphragm is provided adjacent its centre with attachments for fixing a separate wheel-supporting plate.

4. A jig according to claim 3 in which the diaphragm is designed as an annular diaphragm between the outer supporting ring and a central circular plate.

5. A jig according to claim 3 in which the wheel-supporting plate is in the shape of a dish.

6. A jig according to claim 3 in which the bearing plate is provided with a stop face for the diaphragm.

7. A jig according to claim 6 in which the stop face is a centrally located circular face, the diameter of which corresponds substantially to the diameter of the fixing plate also forming a stop element in the centre of the diaphragm.

8. A jig according to claim 1 in which the deformable body is a diaphragm and at least four strain gauge strips are attached on the diaphragm at equally spaced points, each of them being connected as a resistance in a branch of an electric bridge circuit.

9. A jig according to claim 8 in which eight strain gauge strips are equi-spaced circumferentially around the diaphragm, two of them being in each case arranged at generally diametrically opposed points, the diametrically opposed strain gauge strips being connected in parallel with each other in a branch of the bridge circuit.

10. A jig according to claim 1 in which a signal transmitter is arranged between the wheel-supporting plate and the bearing plate, said signal transmitter being capable of producing a signal dependent on the displacement of the wheel supporting plate in relation to the bearing plate.

11. A jig according to claim 1 in which two wheel-supporting plates each with associated means for applying vertical vibration are provided in adjacent locations spaced apart at a distance corresponding to the distance between a pair of wheels of a vehicle.

12. A jig according to claim 11 in which the means for applying vertical vibrations are designed in such a way that the wheel-supporting plates are impacted synchronously.

13. A jig according to claim 11 in which at least one of the jigs can be shifted laterally to provide adjustment to any required track width.

14. A jig according to claim 1 in which the means for applying vertical vibrations is a hydraulic vibration drive.

15. A jig according to claim 1 in which the means for applying vertical vibrations is a mechanical drive.

16. A jig according to claim 15 in which the mechanical drive includes a variable motor.

17. A jig according to claim 1, wherein said determining means includes means for providing a Yes-No indication as an indication of the useability of the shock absorber.

18. A method for determining the behavior of a shock absorber arranged in a wheel suspension unit within the sprung mass system of a vehicle, comprising the steps of causing the wheel to vibrate by applying forces to the wheel in a cycle according to a predetermined relationship of amplitude to frequency, measuring the magnitude value of the vertical contact force applied by the wheel to a support surface while subjecting the wheel to such applied forces, and determining whether the measured vertical contact force exceeds a predetermined minimum contact force when the wheel is subjected to such applied forces as an indication of the useability of the shock absorber.

19. The method according to claim 18, including applying forces to the wheel in accordance with an amplitude/frequency curve and an amplitude/time curve provided by utilizing predetermined numerical values over a selected frequency band.

20. The method according to claim 18, wherein the magnitude value of the wheel contact forces occurring as a result of applied forces to the wheel and in accordance with a force/time diagram are utilized as the criterion with respect to useability of the shock absorber or of side guidance for the vehicle.

21. The method according to claim 18, wherein the step of measuring includes measuring the strain of a body deformed under the force, and further including the steps of measuring the deformation amplitude of the body deformed under the force, and multiplying the measured deformation amplitude by the measured strain and providing an output indicative of the product of the multiplication.

22. The method according to claim 21, further comprising the step of displaying the product of the multiplication which is indicative of the lost work of the sprung mass system.

23. The method according to claim 18, wherein the step of determining includes providing a Yes-No indication of the useability of the shock absorber.

* * * * *